(12) United States Patent
Corral

(10) Patent No.: US 6,959,914 B1
(45) Date of Patent: *Nov. 1, 2005

(54) UTILITY VALVE EXTENSION

(76) Inventor: Felipe H. Corral, 1931 Santa Lucia Ave., Oxnard, CA (US) 93030

(*) Notice: Subject to any disclaimer, the term of this patent is extended or adjusted under 35 U.S.C. 154(b) by 64 days.

This patent is subject to a terminal disclaimer.

(21) Appl. No.: 10/806,565

(22) Filed: Mar. 23, 2004

Related U.S. Application Data

(63) Continuation-in-part of application No. 10/383,918, filed on Mar. 5, 2003, now Pat. No. 6,837,481.

(51) Int. Cl.$^7$ ............................................. F16K 31/00
(52) U.S. Cl. ........................................ 251/293; 4/661
(58) Field of Search ............................. 251/293; 4/661

(56) References Cited

U.S. PATENT DOCUMENTS

| | | | |
|---|---|---|---|
| 400,944 A | * | 4/1889 | Powell ........................ 251/293 |
| 702,342 A | | 6/1902 | Clough |
| 1,995,174 A | | 3/1935 | Gerrard et al. |
| 3,598,361 A | | 8/1971 | Crowe |
| 4,266,320 A | | 5/1981 | Grant |
| 4,807,658 A | * | 2/1989 | Patti ........................... 251/293 |
| 5,711,511 A | | 1/1998 | Cynar |
| 6,178,981 B1 | | 1/2001 | Wales |
| 6,364,285 B1 | * | 4/2002 | Stinnett ....................... 251/293 |

* cited by examiner

Primary Examiner—John Bastianelli
(74) Attorney, Agent, or Firm—Richard S. Erbe

(57) ABSTRACT

A control apparatus for use with utility control valves is disclosed. The control apparatus is in the form of an extension attached to the utility control valve in a variety of applications, such as the water shutoff valve in a toilet tank, sink, or water heater, or a gas valve to a dryer. The extension allows the user to turn off the utility valve without bending, stooping are trying to fit within tight or limited spaces. The extension has provisions to adjust the length to fit a particular application.

17 Claims, 5 Drawing Sheets

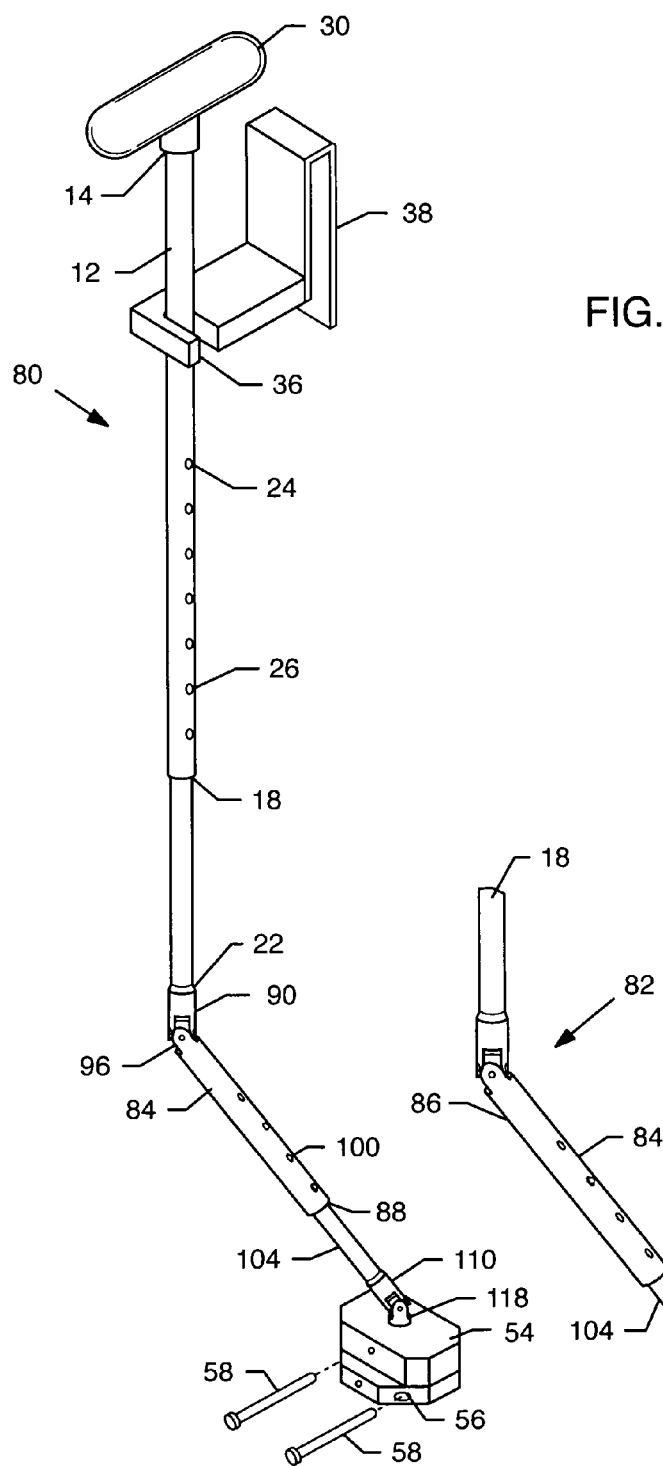
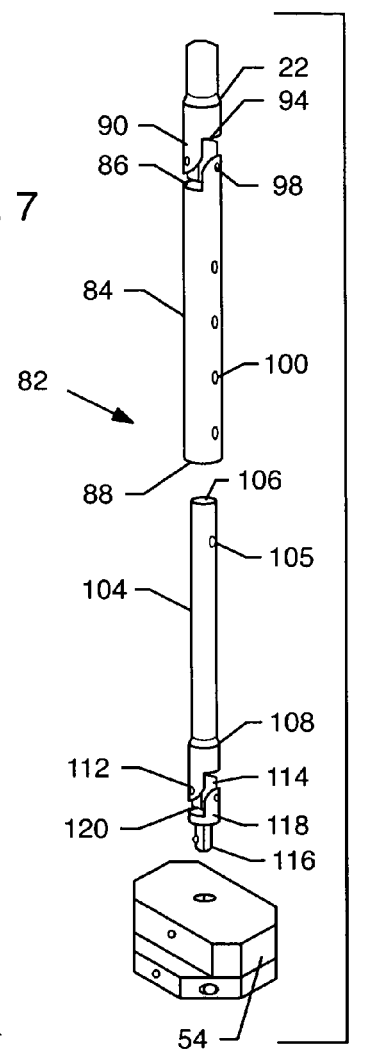
FIG. 5
FIG. 6
FIG. 7

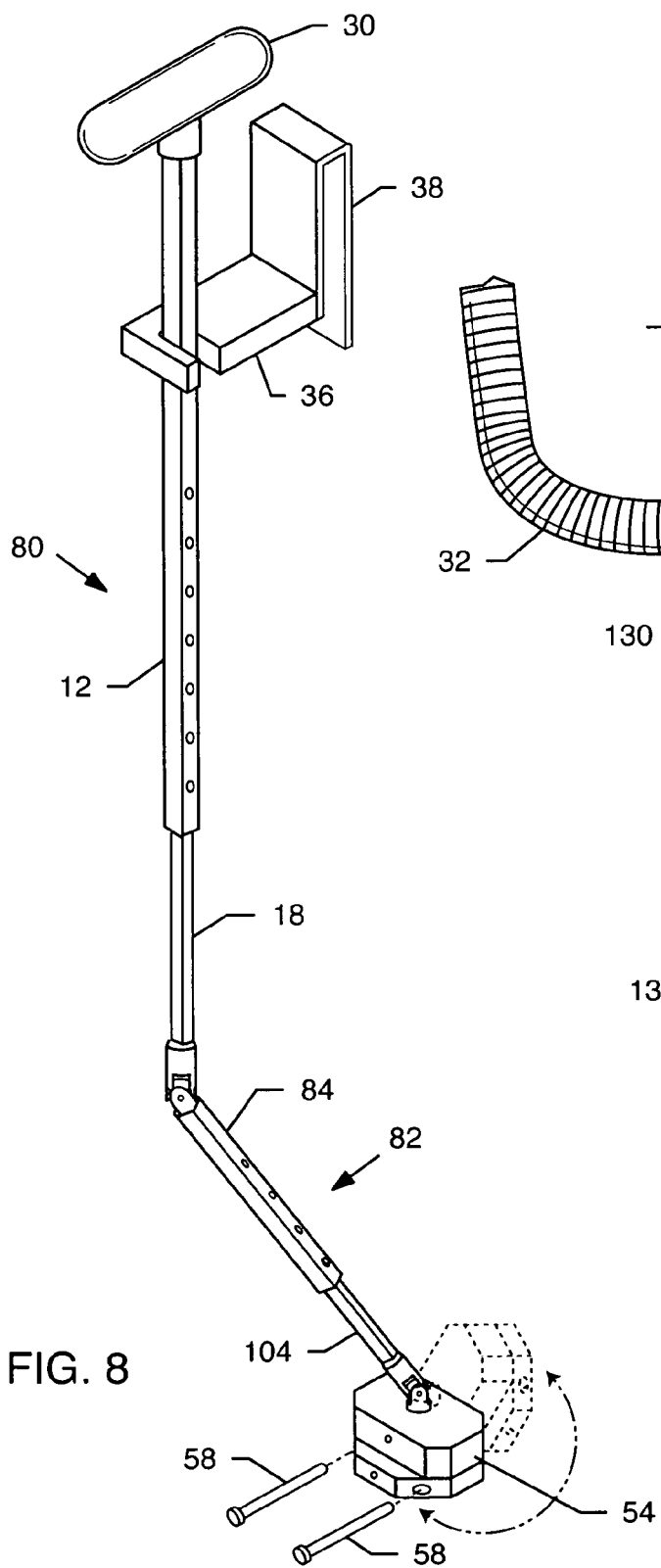
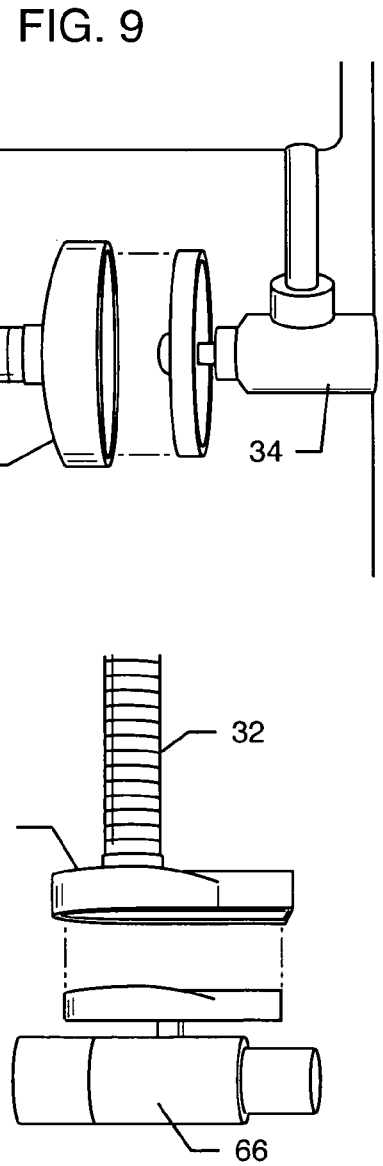
FIG. 8
FIG. 9
FIG. 10

UTILITY VALVE EXTENSION

RELATED APPLICATIONS

This application is a continuation-in-part application of U.S. patent application Ser. No. 10/383,918, filed Mar. 5, 2003 now U.S. Pat. No. 6,837,481.

BACKGROUND OF THE INVENTION

1. Field of the Invention

The present invention relates to devices for controlling the flow of liquids and gases, and more particularly to a device for use with utility control valves in residences and other structures.

2. General Background and State of the Art

On an almost daily basis, people need to control the flow of water or gas to an appliance in their residences. People must be able to turn on and off water to the toilet, dishwasher, clothes washer, hot water heater and other appliances, as well as needing to turn on and shut off the flow of gas to a clothes dryer, for example. In many of these situations, access to the on/off flow control valve is limited because of lack of space. For persons with disabilities or old age, bending down and contorting themselves to access such a valve may be difficult or almost impossible.

There exist valve systems that can automatically stop a toilet tank from overflowing. U.S. Pat. No. 6,047,725 to Gish discloses a valve for controlling the water level in a toilet tank.

U.S. Pat. No. 5,524,299 to Dalfino discloses a shutoff device for an inlet valve preventing leaks and overflowing water from a toilet tank.

U.S. Pat. No. 5,282,280 to Wodeslavsky discloses an inlet and outlet control valve for a toilet.

None of these patents addresses the issue of providing a device that can be used by almost any person, regardless of age, height, or physical condition, for a wide variety of appliances found in a residence to easily shut off the flow of water or gas to the appliance.

There exists, therefore, a need for a device for use in conjunction with utility control valves on appliances to enable the manual opening and closing of the control valve.

There also exists a need for a control device for use in conjunction with utility control valves that provides easy access to any utility control valve, regardless of the valve's location.

There also exists a need for a control device for use in conjunction with utility control valves that can easily be adjusted in length to adapt the device for many situations.

There also exists a need for a control device for use in conjunction with utility control valves that are of durable and reliable construction.

There also exists a need for a control device for use in conjunction with utility control valves that may be easily and efficiently manufactured.

There also exists a need for a control device for use in conjunction with utility control valves that are affordable for elderly and disabled market segments.

None of the known control methods and devices for use in conjunction with utility control valves, either by themselves or in combination, is seen to anticipate or suggest the method and apparatus disclosed and claimed herein.

SUMMARY OF THE INVENTION

Accordingly, it is an object of the invention to provide a control device for use in conjunction with utility control valves that requires a minimum of storage space that is readily adjustable to accommodate access problems and physical conditions of various people.

It is another object of the invention to provide a control device for use in conjunction with utility control valves that may be easily and efficiently manufactured.

It is another object of the invention to provide a control device for use in conjunction with utility control valves that is durable and reliable in construction.

It is yet another object of the invention to provide a control device for use in conjunction with utility control valves that can be used with a variety of utility control valves.

Another object of the invention is to provide a control device for use in conjunction with utility control valves that may be used by almost anyone, especially those with physical limitations.

These and other objectives are achieved by the present invention, which, in a broad aspect, provides the user with an extension attached to the utility control valve in a variety of applications, such as the water shutoff valve in a toilet, sink, or water heater. The extension would makes it much easier for a user to manually turn on and off the water supply to a particular appliance or system in a quick manner. Alternatively, the utility control valve could also be a gas valve or another type of utility control valve.

The present invention is embodied in an extension device that includes a hollow sleeve in which is inserted a shaft. The sleeve includes a number of openings allowing the shaft, and therefore the shaft/sleeve assembly, to be adjusted in length by means of a spring having a button in it that protrudes through one of the openings for when the extension is of the desired length for the immediate application.

In the preferred embodiment of the invention, there is a flexible coiled section at the end of the shaft that is inserted in an adapter head that can be fitted to a utility control valve. By turning a handle at the end of the sleeve, the sleeve, shaft and flexed coil are caused to rotate and turn the valve on or off, as desired.

The sleeve and shaft may be cylindrical, rectangular, or a variety of other shapes.

In an alternative embodiment of the invention, a pivoting arm constructed in a manner similar to that of the sleeve and shaft of the preferred embodiment, takes the place of the flexible coil. This embodiment of the invention can be adjusted to fit a nearly limitless number of situations to access utility control valves.

Further objects and advantages of this invention will become more apparent from the following description of the preferred embodiments, which, taken in conjunction with the accompanying drawings, will illustrate, by way of example, the principles of the invention.

BRIEF DESCRIPTION OF THE DRAWINGS

The foregoing and other objects, aspects and advantages will be better understood from the following detailed description of the preferred embodiments of the invention with reference to the drawings in which:

FIG. 5 illustrates a perspective view of alternative embodiment of an exemplary apparatus according to the present invention;

FIG. 6 illustrates a perspective view of the pivot arm depicted in FIG. 5;

FIG. 7 illustrates another view of the pivot arm depicted in FIGS. 5 and 6;

FIG. 8 illustrates another perspective view of the alternative embodiment of an exemplary apparatus according to the present invention;

FIG. 9 illustrates a sectional view of the exemplary embodiment of the present invention and how it may attach to a water control valve; and FIG. 10 illustrates a sectional view of an exemplary embodiment of the present invention and how it may attach to a gas control valve.

DETAILED DESCRIPTION OF THE PREFERRED EMBODIMENTS OF THE INVENTION

In the following description of the present invention, reference is made to the accompanying drawings, which form a part thereof, and in which are shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

Figure 1:
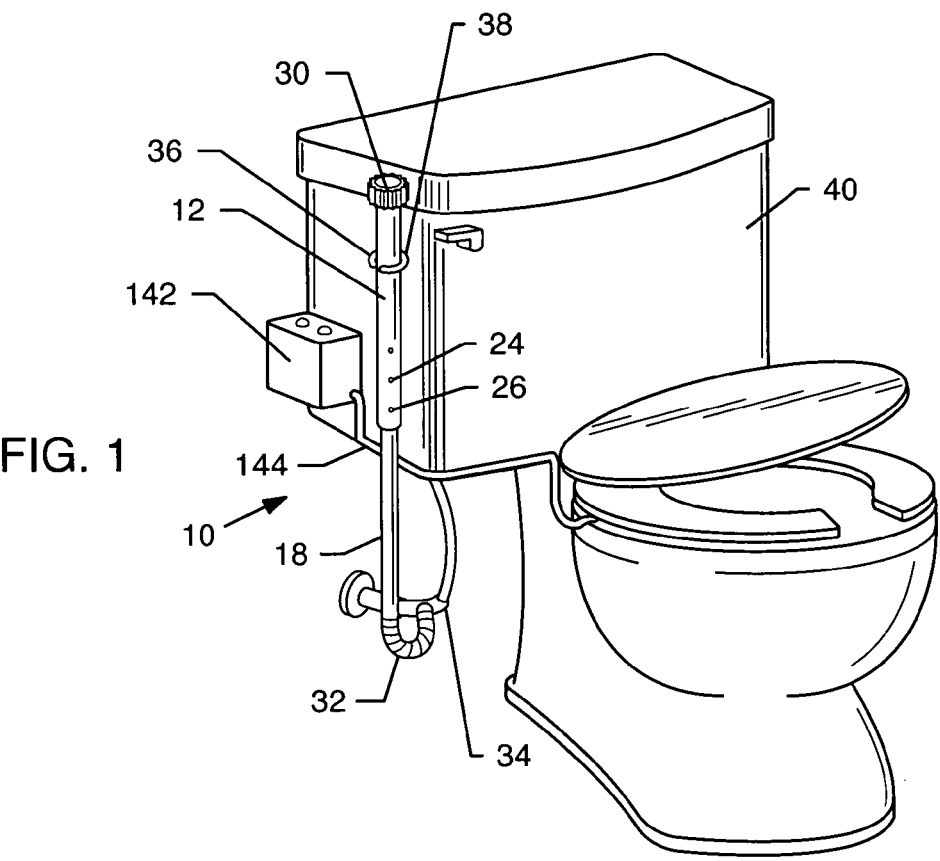
FIG. 1 illustrates a perspective view of an exemplary apparatus according to the present invention in use with a toilet.
Figure 1A:
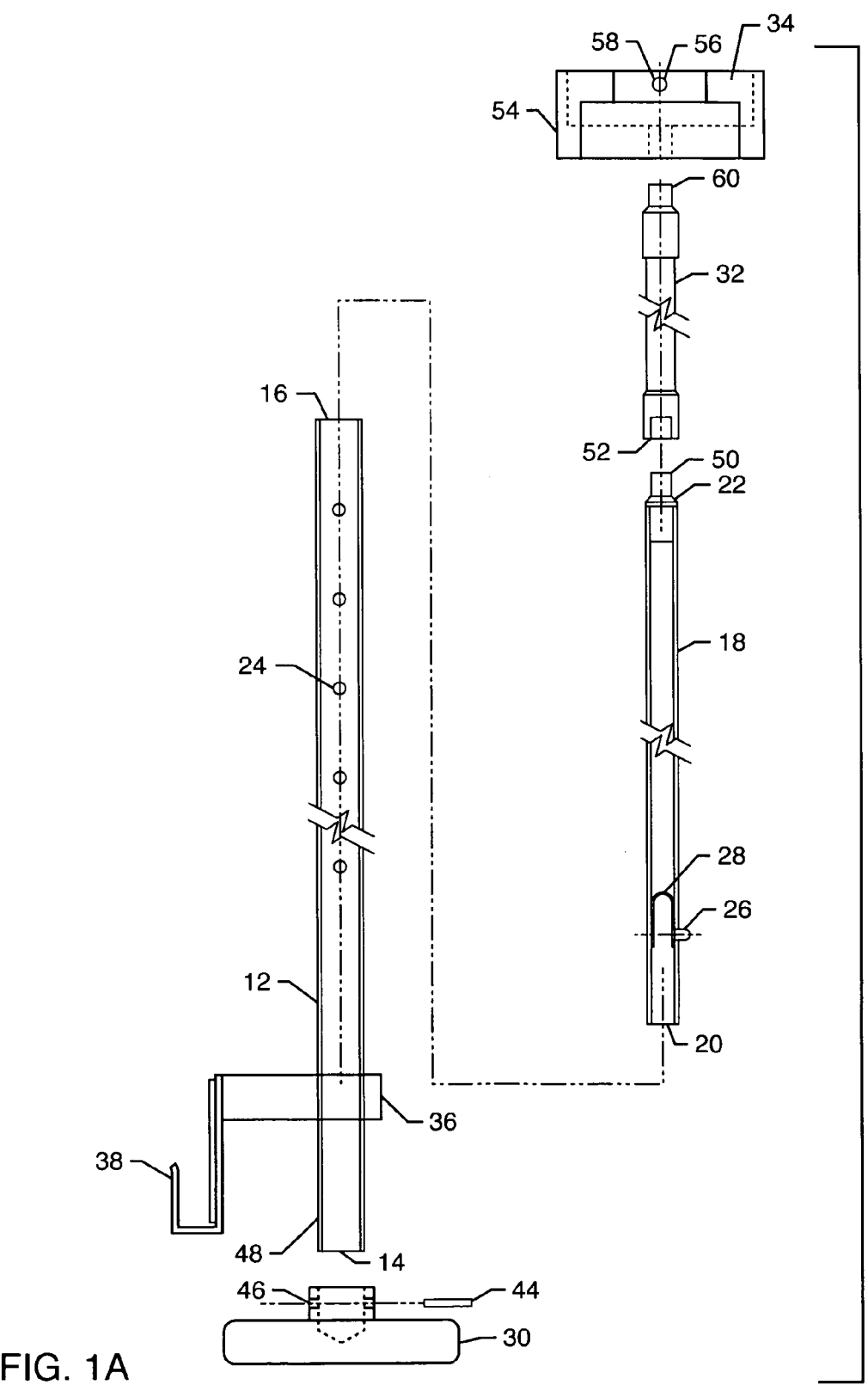
FIG. 1A illustrates an exploded view of an exemplary apparatus according to the present invention.

An extension device according to the present invention is generally referred to by the reference numeral 10. FIG. 1 illustrates a perspective view of extension 10 in use with a toilet 40. FIG. 1A shows an exploded view of extension 10. Extension 10 includes sleeve 12 having first end 14 and second end 16, and shaft 18 having first end 20 and second end 22. First end 20 of shaft 18 is slidably inserted in second end 16 of sleeve 12. Sleeve 12 also includes a plurality of holes 24 arrayed in a row. Within shaft 18 is located spring 28 having a plurality of legs and also having a button 26 which can be used to temporarily fix the position of sleeve 12 relative to shaft 18. While FIGS. 1, 1A, 2, 3 and 4 depict sleeve 12 and shaft 18 to be cylindrical, those skilled in the art will recognize that sleeve 12 and shaft 18 could take on several other shapes, such as rectangular, without departing from the scope of the invention.

First end 14 of sleeve 12 has a handle 30 that is connected to sleeve 12 by means of pin 44 extending through holes 46 through handle 30, and holes 48 through sleeve 12. In the preferred embodiment of the invention, when shaft 18 is fully extended outside of sleeve 12, extension 10 is about 30 to 36 inches in length.

As illustrated in FIG. 1A, second end 22 of shaft 18 has a tip coupling 50, which attaches via female insert 52 in flex coil 32. At the other end of flex coil 32 is male insert 60 which connects to adapter 54, which may be connected to a water control valve 34 located behind toilet 40. Adapter 54 is secured to water control valve 34 by means of openings 56 in adapter 54 and pins 58.

By turning handle 30, the user causes extension 10 and flex coil 32 to rotate and to ultimately turn handle 30 to the right or left, as desired. This action turns the water supply to toilet 40 on or off, depending which way handle 30 is turned.

Mount 36 and hook 38 hold sleeve 12 to the side of the toilet tank, providing support to extension 10 and allowing it to remain in an upright position. Hook 38 loops over the inside of the tank on toilet 40, while mount 36 is either a cylindrical ring or loosely fit holder that allows extension 10 to rotate when handle 30 is rotated. In the absence of hook 38, mount 36 could be attached to a fixed object.

FIG. 1 also shows water level indicator 142 attached to the side of toilet 40. Indicator 142 is attached to a water level sensor (not shown) located in the toilet bowl, by cord 144. When the water level inside toilet 40 gets too high, the water level sensor will indicate this condition and will trigger indicator 142 to emit an alarm or beeping noise so that those present know that the water should be turned off.

Figure 2:
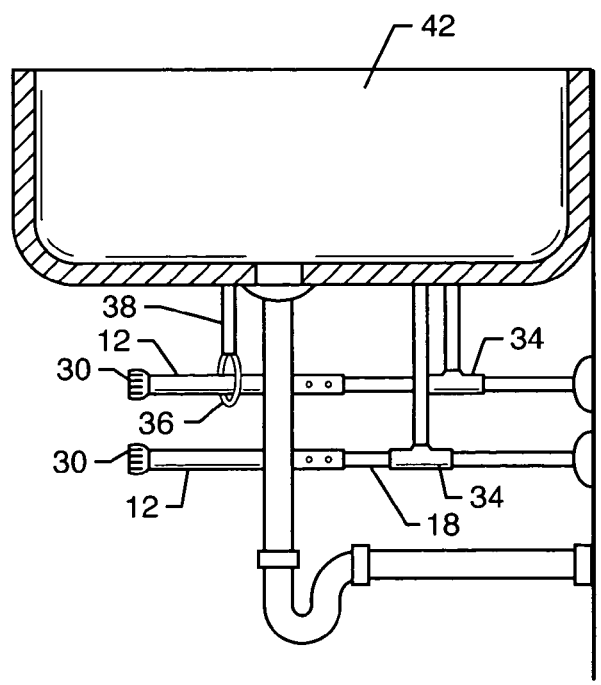
FIG. 2 illustrates a perspective view of an exemplary apparatus according to the present invention in use with a sink.

FIG. 2 illustrates a perspective view of extension 10 in use with a sink 42. This application of extension 10 allows a user to turn on and turn off the water flow to sink 22 much more easily than with any device known in the existing art. In this application, flex coil 32 would not be needed because extension 10 would be in a "straight line" configuration with some of the existing plumbing already under sink 22. Mount 36 holds extension 10 in place.

Figure 3:
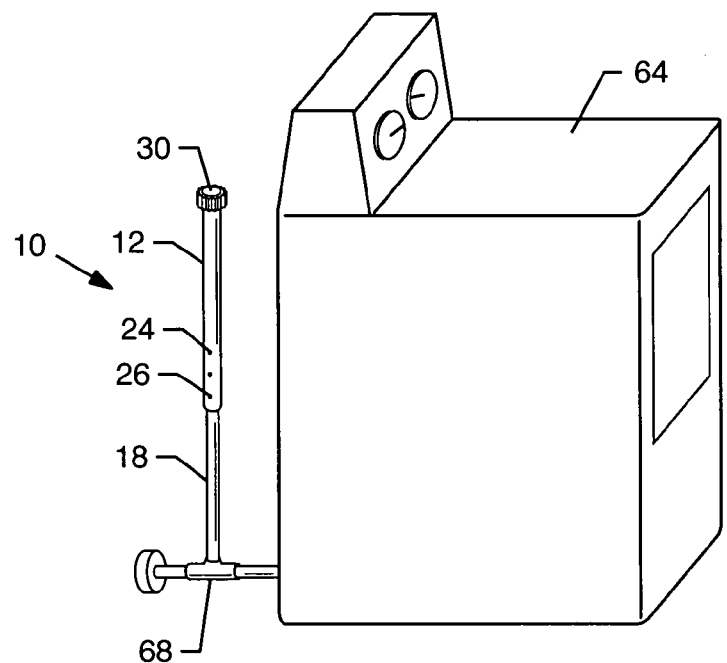
FIG. 3 illustrates a perspective view of an exemplary apparatus according to the present invention in use with a stove or gas dryer.

FIG. 3 illustrates a perspective view of extension 10 in use with a stove or gas dryer. In this application, extension 10 is used to regulate the flow of natural gas, rather than the flow of water. Valve 68 is a gas control valve rather than a water control valve.

Figure 4:
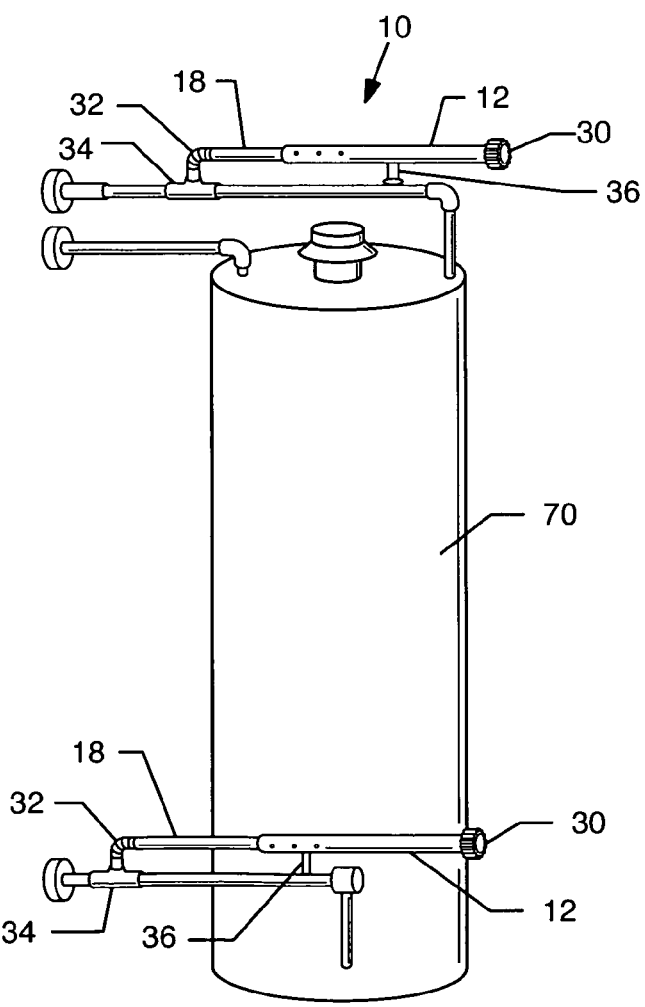
FIG. 4 illustrates a perspective view of an exemplary apparatus according to the present invention in use with a water heater.

FIG. 4 illustrates a perspective view of extension 10 in use with a water heater 64. In this application of the invention, extension 10 functions in essentially the same way as it does when used with the sink. In this application, it would be preferable to have two extensions 10 in use, one in the hot water line and the other with the cold water line. A mount 36 holds extension 10 in place.

FIGS. 5, 6 and 7 illustrate an alternative embodiment 80 of the invention. In this embodiment of the invention, flex coil 32 is replaced by a pivot arm 82. Pivot arm 82 resembles the combination of sleeve 12 and shaft 18, as will be described, and allows another way for the invention to be adjusted to fit a particular application.

Pivot arm 82 includes pivot arm sleeve 84 and pivot arm shaft 104. Sleeve 84 includes a pivoting connection at second end 22 of shaft 18. Yoke 90 on second end 22 includes openings for pivot pin 92 to link to pivot pin receptacle 94. Yoke 96 on the first end 86 of pivot arm sleeve 84 includes openings for pivot pin 98, which links yoke 96 to pivot pin 94. This construction provides a connection between pivot arm sleeve 84 and shaft 18 that allows the connection to be manipulated in a variety of ways that allows extension 80 to provide the user with a versatile, powerful tool that can be used for a variety of applications regardless of accessibility problems.

Pivot arm 82 may be adjusted in length in a manner similar to sleeve 12 and shaft 18. First end 106 of shaft 104 is slidably inserted sleeve 84 at second end 88. Within shaft 104 is located a spring (not shown) having a button 105 which can be used to temporarily fix the position of sleeve 84 relative to shaft 104.

At second end 108 of shaft 104 is yoke 110. Yoke 110 includes openings through which is inserted pivot pin 112, which provides a pivotable connection to pivot pin receptacle 114. An adapter insert 116 includes yoke 118, located near second end 108, and also includes openings for pivot pin 120 for connection to pivot pin receptacle 114. This configuration provides a pivotable connection between adapter insert 116 and shaft 104.

Adapter insert 116 provides a connection to adapter 54, similar to the way in which flex coil 32 is connected to adapter 54 in the embodiment of the invention represented by extension 10. Adapter 54 is secured to gas control valve 66 by means of openings 56 in adapter 54 and pins 58. Adapter 54 could be adapted to attach with many other types of utility control valves as well.

FIG. 8 illustrates extension 80 showing sleeve 12, shaft 18 and pivot arm 82 are shown configured as being rectangular in shape, while FIGS. 5–7 illustrate that extension 80 may take on a cylindrical shape. Those skilled in the art will recognize that other configurations for extension 10 and extension 80 are possible, without departing from the scope of the invention.

FIGS. 9 and 10 illustrate an alternative feature that can be incorporated with the present invention. Instead of adapter 54 for attaching to a utility control valve, fitted cover 130, which is designed to fit most common water control-valves 34 or gas control valves 66 can be used without the necessity of any pins 58.

The foregoing description of exemplary embodiments of the present invention has been presented for purposes of enablement, illustration, and description. It is not intended to be exhaustive of or to limit the present invention to the precise forms discussed. There are, however, other configurations for utility valve extensions not specifically described herein, but with which the present invention is applicable. The present invention should therefore not be seen as limited to the particular embodiments described herein; rather, it should be understood that the present invention has wide applicability with respect to utility valve extensions. Such other configurations can be achieved by those skilled in the art in view of the description herein. Accordingly, the scope of the invention is defined by the following claims.

What is claimed is:

1. A control apparatus for use with utility control valves:
   a hollow sleeve having an outer surface, a plurality of openings in said surface, and opposed first and second ends;
   a handle attached to said first end of said sleeve;
   a shaft having opposed first and second ends, said first end of said shaft adapted to be inserted within said first end of said sleeve;
   a spring having a plurality of arms located within said shaft;
   a button attached to one of said arms, said button configured to extend through said openings in said sleeve; and
   a flexible coil having opposed first and second ends, said first end of said coil attached to said second end of said shaft.

2. The control apparatus according to claim 1 further comprising an adaptive connector at said second end of said flexible coil for attaching to a utility control valve.

3. The control apparatus according to claim 1 further comprising a mounting means for mounting said apparatus to an object.

4. The control apparatus according to claim 3, wherein said mounting means comprises:
   a holder; and
   a hook attached to the holder.

5. The control apparatus according to claim 4, wherein said holder is a cylindrical ring.

6. The control apparatus according to claim 1, wherein said sleeve and said shaft are cylindrical.

7. The control apparatus according to claim 1, wherein said sleeve and said shaft are rectangular.

8. A control apparatus for use with utility valves comprising:
   a hollow sleeve having an outer surface, a plurality of openings in said surface, and opposed first and second ends;
   a handle attached to said first end of said sleeve;
   a shaft having opposed first and second ends, said first end of said shaft adapted to be inserted within said second end of said sleeve;
   a spring having a plurality of arms located within said shaft;
   a button attached to one of said arms, said button configured to extend through said openings in said sleeve; and
   a pivot arm having opposed first and second ends, said first end of said coil pivotably attached to said second end of said shaft.

9. The control apparatus according to claim 8, wherein said pivot arm comprises:
   a hollow sleeve having an outer surface, a plurality of openings in said surface, and opposed first and second ends;
   a shaft having opposed first and second ends, said first end of said shaft adapted to be inserted within said second end of said sleeve;
   a spring having a plurality of arms located within said shaft; and
   a button attached to one of said arms, said button configured to extend through said openings in said sleeve.

10. The control apparatus according to claim 8 further comprising an adaptive connector at said second end of said pivot for attaching to a utility control valve.

11. The control apparatus according to claim 8 further comprising a mounting means for mounting said apparatus to an object.

12. The control apparatus according to claim 11 wherein said mounting means comprises:
   a holder; and
   a hook attached to the holder.

13. The control apparatus according to claim 12, wherein said holder is a cylindrical ring.

14. The control apparatus according to claim 8, wherein said sleeve and said shaft are cylindrical.

15. The control apparatus according to claim 8, wherein said sleeve and said shaft are rectangular.

16. The control apparatus according to claim 9, wherein said sleeve and said shaft are cylindrical.

17. The control apparatus according to claim 9, wherein said sleeve and said shaft are rectangular.

* * * * *